United States Patent [19]

Nakajima

[11] Patent Number: 5,208,873
[45] Date of Patent: May 4, 1993

[54] IMAGE READER HAVING AN EDITOR FOR SETTING A THRESHOLD VALUE

[75] Inventor: Akio Nakajima, Osaka, Japan

[73] Assignee: Minolta Camera Kabushiki Kaisha, Osaka, Japan

[21] Appl. No.: 701,348

[22] Filed: May 9, 1991

Related U.S. Application Data

[63] Continuation of Ser. No. 242,348, Sep. 9, 1988, abandoned.

[30] Foreign Application Priority Data

Sep. 10, 1987 [JP] Japan .................. 62-227484
Sep. 10, 1987 [JP] Japan .................. 62-227485

[51] Int. Cl.⁵ .................................... H04N 1/415
[52] U.S. Cl. .................................... 382/50; 382/52; 358/466; 358/453
[58] Field of Search .......... 382/50, 52, 53, 9; 358/456, 457, 462, 464, 466, 453

[56] References Cited

U.S. PATENT DOCUMENTS

| | | | |
|---|---|---|---|
| 4,086,478 | 4/1978 | Okano | 235/466 |
| 4,357,596 | 11/1982 | Feilchenfeld | 235/436 |
| 4,384,272 | 5/1983 | Tanaka et al. | 382/50 |
| 4,420,742 | 12/1983 | Tadauchi et al. | 382/50 |
| 4,464,681 | 8/1984 | Jacobs et al. | 358/285 |
| 4,471,386 | 9/1984 | Tuhro | 350/280 |
| 4,517,606 | 5/1985 | Yokomizo et al. | 358/280 |
| 4,547,811 | 10/1985 | Ochi et al. | 358/466 |
| 4,562,486 | 12/1985 | Suzuki et al. | 382/53 |
| 4,566,125 | 1/1986 | Clunn | 382/50 |
| 4,584,703 | 4/1986 | Hallberg | 382/7 |
| 4,724,330 | 2/1988 | Tuhro | 250/578 |
| 4,728,984 | 3/1988 | Daniele | 355/6 |
| 4,751,376 | 6/1988 | Sugiura et al. | 250/201 |
| 4,850,029 | 7/1989 | Moyer et al. | 382/33 |
| 5,003,616 | 3/1991 | Orita et al. | 382/50 |

FOREIGN PATENT DOCUMENTS

58-172061 10/1983 Japan .
58-184160 10/1983 Japan .
62-161273 7/1987 Japan .
62-181563 8/1987 Japan .

Primary Examiner—Michael T. Razavi
Assistant Examiner—Steven P. Klocinski
Attorney, Agent, or Firm—Burns, Doane, Swecker & Mathis

[57] ABSTRACT

An image reader for reading an image of a document by an image sensor and for outputting image data after processing obtained image data includes an arrangement for binarizing image data read by the image sensor through comparison of the image data with a threshold. A system is provided for entering the threshold value from an exterior source and for giving the threshold value to the binarizing arrangement. Also, a control device is provided for controlling that system.

8 Claims, 9 Drawing Sheets

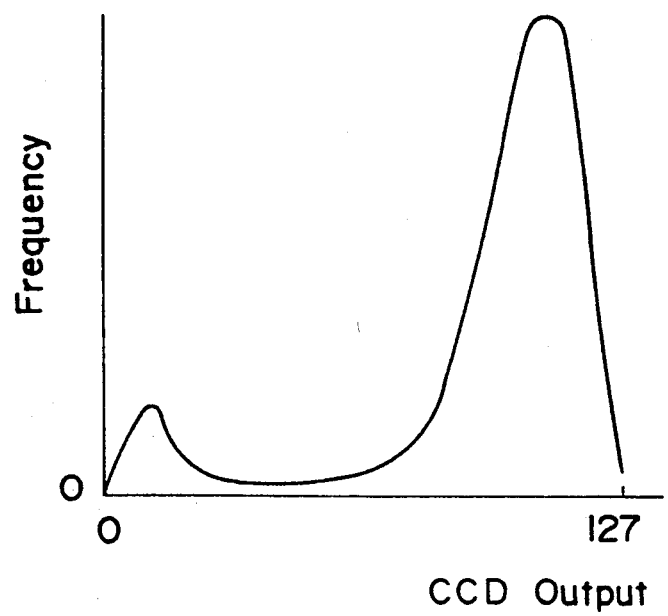
Fig. 10 - PRIOR ART
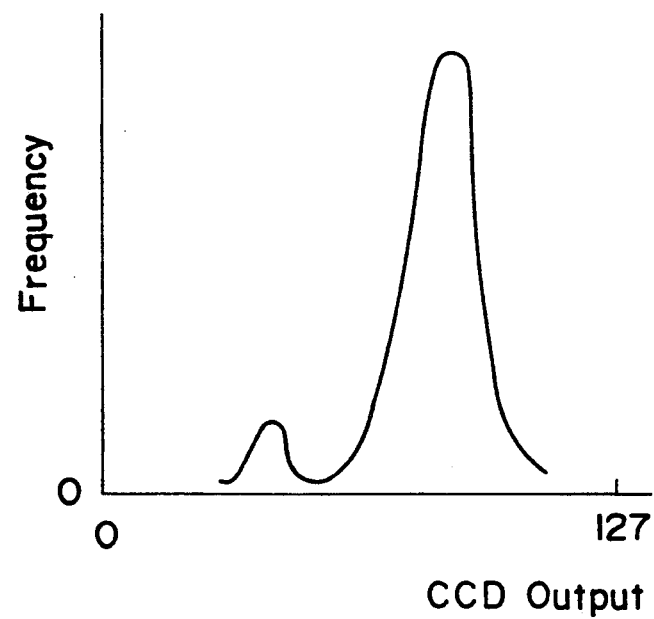
Fig. 11 - PRIOR ART

IMAGE READER HAVING AN EDITOR FOR SETTING A THRESHOLD VALUE

This application is a continuation of application Ser. No. 07/242,348, filed Sep. 9, 1988, now abandoned.

BACKGROUND OF THE INVENTION

1. Field of the Invention

The present invention relates to an image reader for reading an image of a document with the use of an image sensor.

2. Description of the Prior Art

In such an image reader mentioned above, an image of a document is read by the image sensor and obtained image data is the digitalized and, further, digitalized data is binarized with the use of a predetermined threshold. Binary image data thus obtained is outputted to an external apparatus such as a printer.

In an ordinal character document wherein characters of black color are printed on a white background, the white background and black characters are clearly distinguished from each other.

FIG. 10 shows a frequency distribution of output data outputted from individual picture elements of the image sensor such as a CCD (charge coupled device) image sensor when a character document is read thereby. As shown clearly therein, peaks corresponding to black data and white data appear apart from each other. Accordingly, a fixed threshold is used to discriminate character data from the background data and a minor change in the value of the fixed threshold does not affect to a document image that is to be outputted.

However, if the document is a blue copy in which characters of blue color are formed on a blue background, respective peaks corresponding to characters and the background appear close to each other, as shown in FIG. 11.

In such a case, characters are erased or background data is overlapped over characters when a fixed threshold is used for binarizing image data.

Further, the method for varying the intensity of exposurement stepwise is not effective in such a case.

SUMMARY OF THE INVENTION

One object of the present invention is to provide an image reader which is capable of processing image data with a threshold suitable for properties of respective images to be read.

Another object of the present invention is to provide an image reader which is capable of processing image data belonging to each of the image areas of a document with a threshold suitable for the image of each image area.

In order to achieve these objects, according to the present invention, there is provided an image reader for reading an image of a document by an image sensor and for outputting image data after processing the obtained image data, being characterized by: binarization means for binarizing image data read by said image sensor by comparing respective image data with a threshold, said threshold being held fixed at a predetermined value during the processing of image data belonging to at least one image area of a document: means for giving said fixed threshold to said binarization means: means for designating a fixed threshold to be given: and control means for controlling said fixed threshold giving means so as to give the fixed threshold designated by said designation means.

According to the present invention, the threshold for processing image data can be varied according to properties of the images to be processed.

BRIEF DESCRIPTION OF DRAWINGS

These and other objects and features of the present invention will become more apparent when the preferred embodiment of the present invention is described in detail with reference to the accompanying drawings in that:

FIG. 10 is a graph showing frequency distribution of levels of outputs from CCD array when an ordinal character document is read: and FIG. 11 is a graph showing frequency distribution of levels of outputs from CCD array when a document such as a blue copy is read.

DETAILED DESCRIPTION OF THE PREFERRED EMBODIMENT

(a) Mechanism of Image Reader

Figure 1:
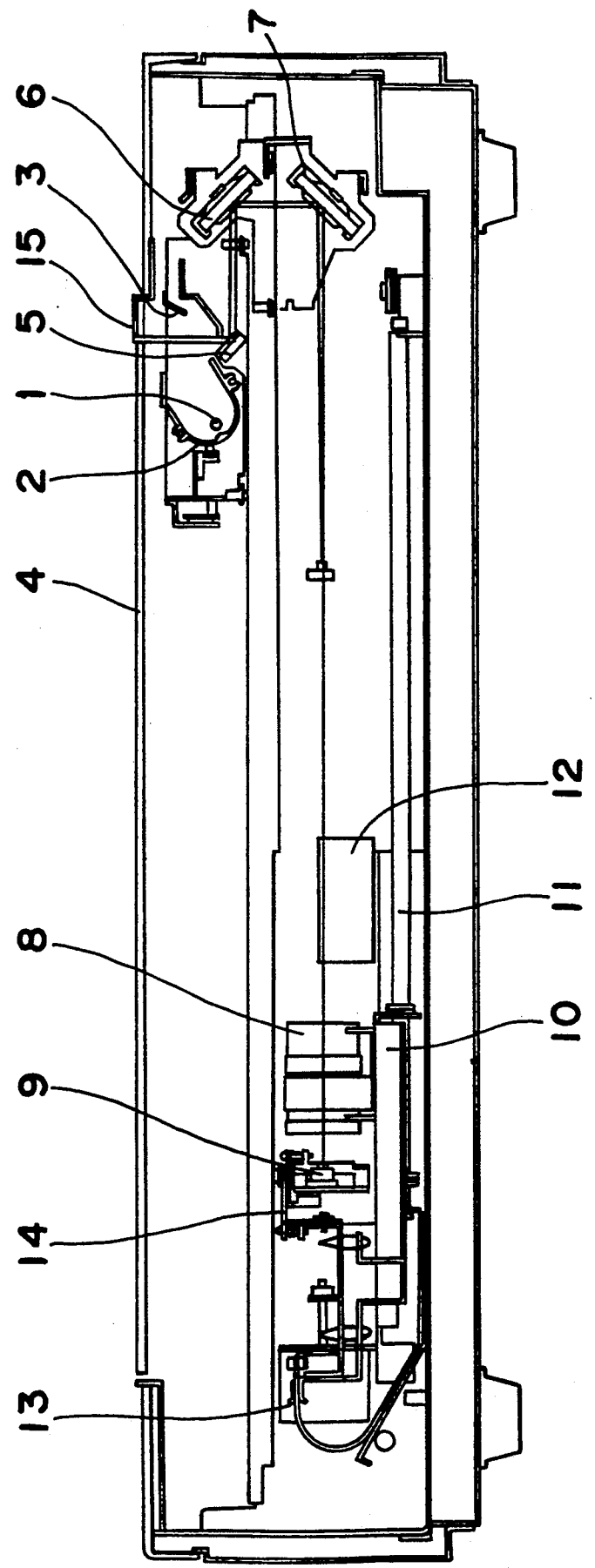
FIG. 1 is a cross-sectional view of an image reader according to the preferred embodiment of the present invention.

FIG. 1 shows a cross-sectional view along the center line of an image reader including an optical reader for reading a variable magnification.

Light emitted from an illumination lamp 1 is concentrated at a reading position on a glass platen 4 for putting a document by reflecting mirrors 2 and 3.

Reflected light from the document is successively reflected by mirrors 5, 6 and 7 and, thereafter, is focused on a CCD (Charge Coupled Device) array 9 as an image reader by a focusing lens 8.

Upon reading a document, the mirrors 6 and 7 are moved at a speed of one half of the speed of the illumination lamp 1 and the mirror 5 in a sub-scan direction so that an optical light path from a reading position to the focusing lens 8 can be kept constant to maintain the in-focus state of a document image. The image focused on the CCD array 9 is transduced photoelectrically into image data thereby and image data is transmitted to an image processor which will be explained later.

The distance "a" from the reading position to the focusing lens 8 is adjusted by driving a lens motor 12 for moving a holder 10 for the focusing lens 8 along a guide rod 11. The distance "b" defined between the focusing lens 8 and the CCD array 9 is adjusted by driving a focusing motor 13 for moving a holder 14 for the CCD array 9 along the optical axis of the focusing lens 8. The latter holder 14 is mounted on the former holder 10.

(b) Internal Structure of Image Reader

Figure 2:
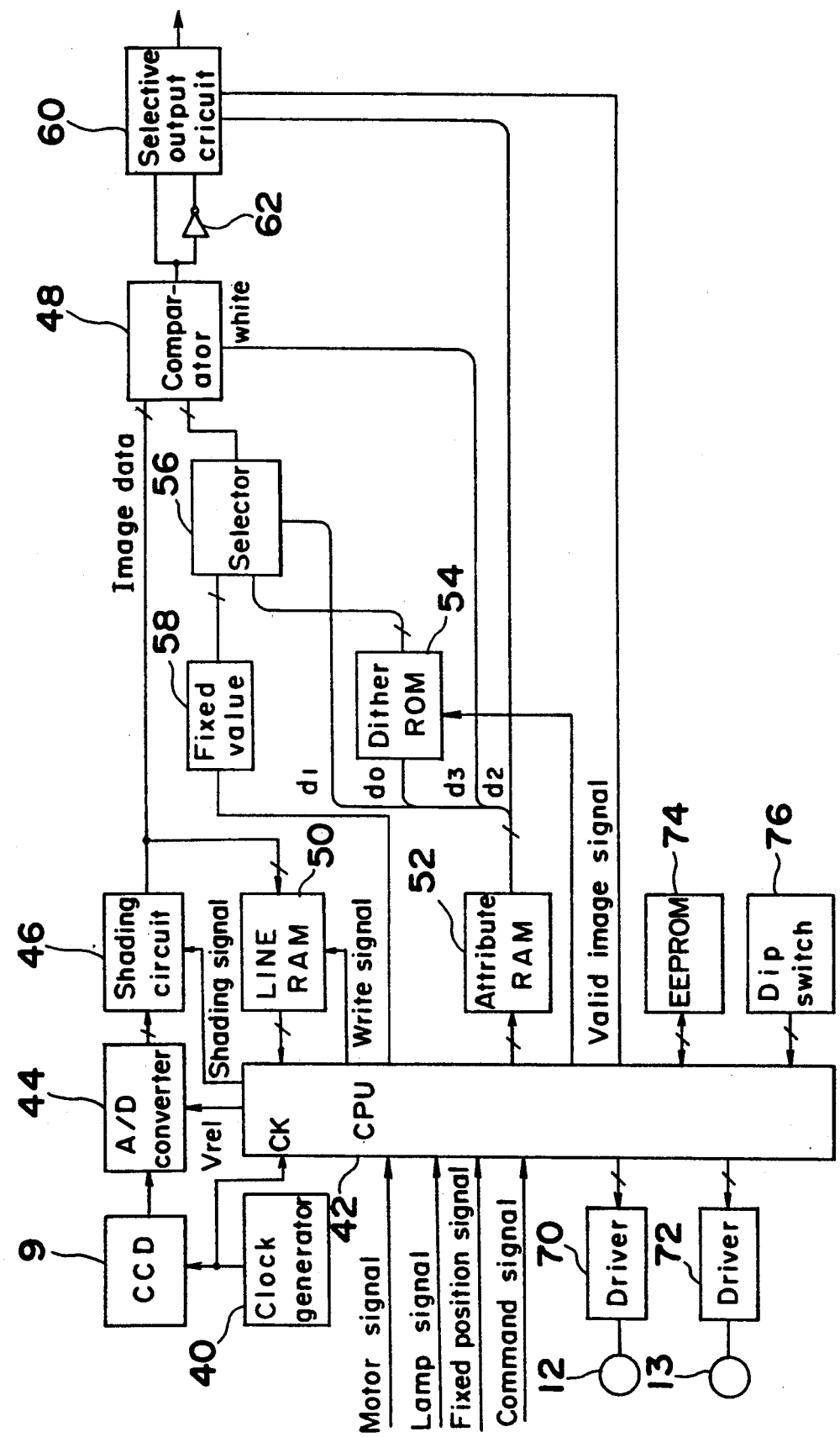
FIG. 2 is a block diagram of an image reading circuit according to the preferred embodiment of the present invention.

FIG. 2 shows a block diagram of a circuit for detecting the density of a document.

A clock generator 40 outputs an SH (sample hold) signal to the CCD array 9 at every reading of one line data and is connected to a CPU 42 (central processing unit) in order to give clock signals thereto. An A/D converter 44 converts analogue signals from the CCD array 9 to digital signals. A shading circuit 46 is provided for correcting possible uneven distribution of the illumination light in the main scanning direction and possible variety of individual CCD chips of the CCD array 9. The CPU 42 controls the shading circuit 46 by outputting timing signals thereto. Output of the shading circuit 46 is input into a comparator 48 and a line RAM 50. The line RAM 50 memorizes data of one scan line being comprised of respective signals corrected by the shading circuit 46. WRITE signals to the line RAM 50 are outputted from the CPU 42 and the latter obtains image information of one scan line by referring to the data memorized in the line RAM 50. Alternatively, all data of a document are read into a memory means with a capacity of storing one page data at first and, image information is outputted by every line data from the memory means.

The CPU 42 controls the lens motor 12 and the focusing motor 13 via respective drivers 70 and 72 in order to drive them. It is also connected to an EEPROM (Electrically Erasable Programmable Read Only Memory) 74 for memorizing magnifications and receives a signal sent from a dip switch 76 for setting an action mode of the image reader. An editor 78 shown in FIG. 3 sends data such as commands for editing images, coordinates for specifying areas of a document image and the like to the CPU 42. Further, the CPU 42 controls the whole image reader by signals mentioned above, a motor signal, a lamp signal, a fixed position signal and command signals.

An attribute RAM 52 memorizes data regarding attributes of respective areas when requested by a command designated from an operation panel (not shown).

A dither ROM 54 generates either one of dither patterns 1 and 2 each comprised of a matrix of m×n threshold values in accordance with the value of attribute information $d_0$. A selector 56 selects either of the dither matrices from the dither ROM 54 and the fixed threshold value generated by a generator 58 therefor in accordance with attribute information $d_1$ and sends the selected one to the comparator 48. Namely, if the attribute of the present area is designated to the dither, the selector 56 sends data of the dither ROM 54 to the comparator 48 and sends the fixed threshold information of the generator 58 to the comparator 48 if the attribute is designated to the fixed threshold value. The comparator 48 compares image data with respective threshold values selected by the selector 56 and sends the result of the comparison to a selective output circuit 60.

If the attribute information $d_3$ is "1", the comparator 48 sends data of white to the selective output circuit 60 irrespective of image data. Further, the data inverted by an inverter 62 is input to the selective output circuit 60. The same selects either of non inverted data according to attribute information $d_2$ sent from the attribute RAM 52 directly and outputs the selected data to a printer (not shown) in synchronous with valid image signals directly sent thereto.

Figure 3:
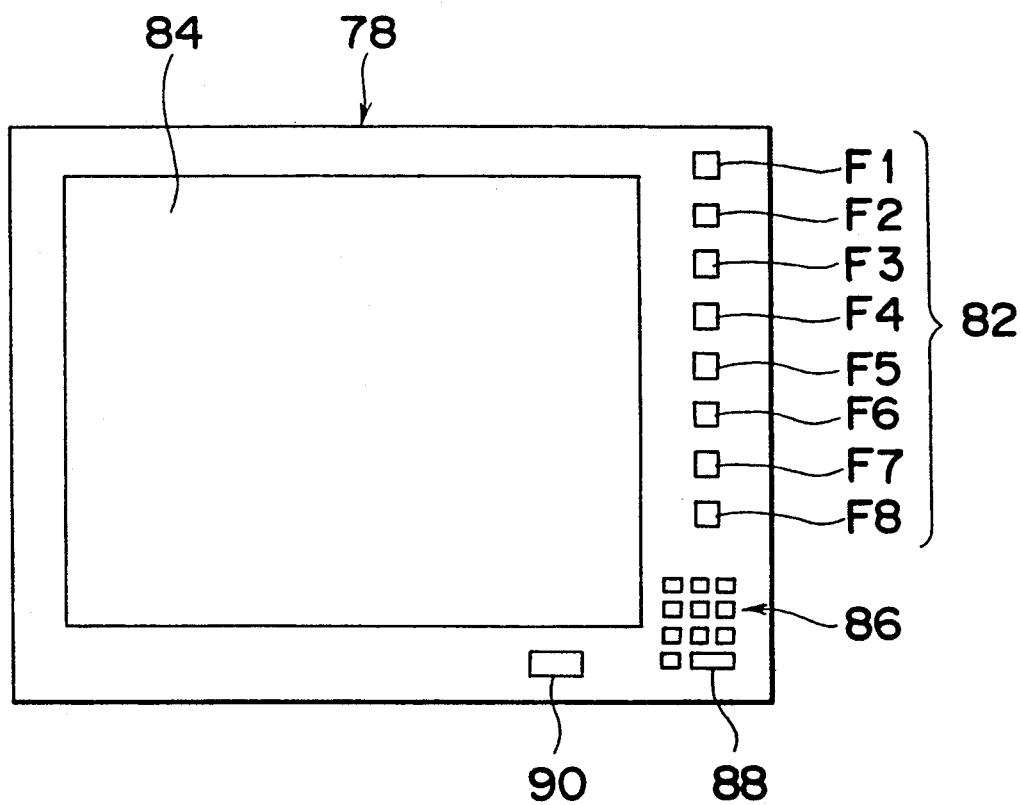
FIG. 3 is a plan view of an editor for setting attributes according to the present invention.

FIG. 3 shows a plan view of the editor 78.

On the right-hand side of the editor 78, function keys from F1 to F8 generally indicated by a reference numeral 82 are provided for entering various commands.

The function key F1 is a trimming key for erasing data located outside of a rectangular area to be designated with use of the editor. The function key F2 is a masking key for erasing data located inside of a rectangular area when designated. The function key F3 is a key for designating a kind of threshold to a dither pattern for half-tone image as an attribute for the inside of a designated area and the function key F4 is a key for designating a kind of threshold to a fixed threshold for character image as an attribute for the inside of a designated area. The function key F5 is a key for setting default values. The function key F6 is a key for setting a value of threshold to be designated.

The function key F7 is a key for designating a size upon setting defaults and the function key F8 is a key for designating the reading magnification. These two keys F7 and F8 are used in cooperation with an entry key group 86 for entering a numeral and a set key 88. Namely, after operating the key F7 or F8, a size for reading or a reading magnification is entered with use of the entry key group 86 and, then, the set key 88 is pushed to verify the entered value. Some keys of the entry key group 86 are made to correspond to available sizes one to one.

Further, a key 90 is a scan key for starting scanning operation.

When at least one of these keys is operated, information corresponding thereto is transmitted to the CPU 42.

The editor 78 has an area 84 for editing images.

Each point on the area 84 is made to correspond to a point on a document one to one and, when one point on the area 84 is indicated by a write (or light) pen (not shown), the coordinate (address) (X, Y) of the indicated point is transmitted to the CPU 42.

Next, the attributes RAM 52 will be explained.

In the preferred embodiment of the present invention, the whole image area is divided into some small areas in unit of 1×1 mm$^2$ and each of the attributes suitable for or designated to individual divided areas is memorized in the attribute RAM 52. According to the attribute information, individual images are edited.

Each of the attribute data to be written into the attribute RAM 52 is comprised of four bits ($d_3$, $d_2$, $d_1$, $d_0$) and each bit indicates attribute information as shown in Table 1.

TABLE 1

| (Attribute Information) | |
|---|---|
| | content |
| $d_3$ | white or valid picture element |
| $d_2$ | inverted or non-inverted |
| $d_1$ | binary value or dither matrix |
| $d_0$ | dither pattern 1 or 2 |

Namely, $d_0$ designates either of the dither patterns 1 and 2, $d_1$ designates either of the binary value processing and the dither processing, $d_2$ indicates either of the inversion of black to white and vice versa and the non-inversion. The bit of $d_3$ indicates to delete or erase black data to obtain a blank area.

Using these attribute information of four bits as shown in Table 1, the following eight attributes are given as shown in Table 2.

TABLE 2

| Code | Attribute |
| --- | --- |
| 00xx | all white |
| 01xx | all black |
| 100x | fixed threshold value |
| 1010 | dither pattern 1 |
| 1011 | dither pattern 2 |
| 110x | inversion with fixed threshold value |
| 1110 | inversion with dither pattern 1 |
| 1111 | inversion with dither pattern 2 |

* x indicates data to be neglected irrespective to the value thereof.

It becomes possible to edit images in various modes such as masking, trimming, inversion of black to white and vice versa, switching from the fixed threshold value to the half tone processing or vice versa and the like with use of the attribute RAM 52.

Figure 4:
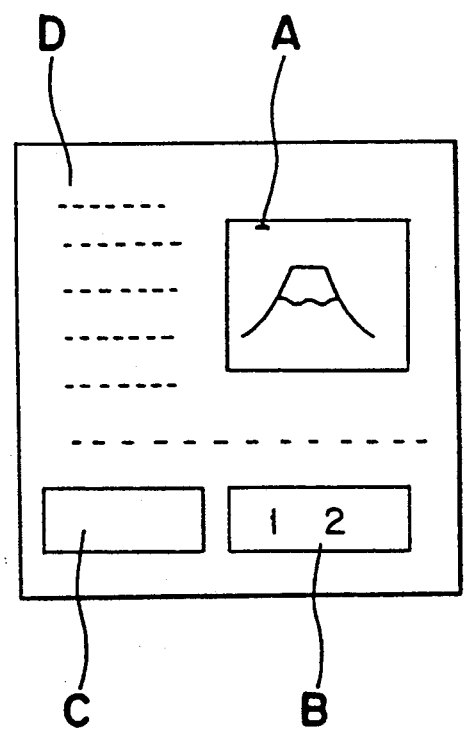
FIG. 4 is an example of a print edited according to designated attributes.

FIG. 4 shows an example obtained with use of the method according to the present invention. In the print shown in FIG. 4, a portion A is a photograph, a portion B is an area to be inverted black to white and vice versa, a portion C is an area to be erased and a remaining portion D is an ordinal character portion.

Figure 5:
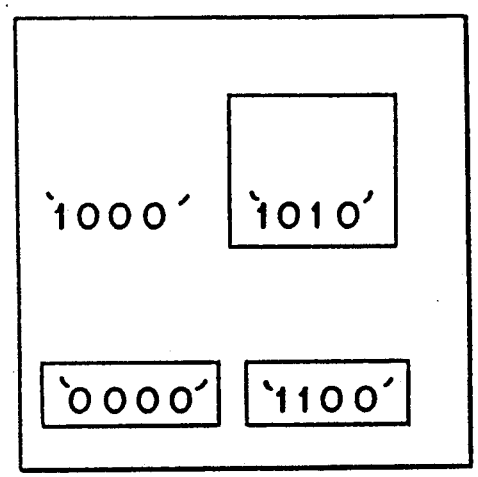
FIG. 5 is an example of attributes designated to obtain the print shown in FIG. 4.

Accordingly, the following attributes are assigned to individual portions A to D, respectively.

portion A . . . half tone processing with the dither pattern 1
portion B . . . inversion of characters
portion C . . . erasing
portion D . . . processing with the fixed binary value In this case, attribute codes as shown in FIG. 5 are written into respective areas A to D of the attribute RAM 52 in unit of 1×1 mm². Therefore, image data is processed according to the attributes assigned in the attribute RAM 52.

(c) Setting of Initializing Mode

The image reader according to the preferred embodiment performs an initial setting by reading the initializing mode defined by default values from the EEPROM 74.

The contents of the initializing mode stored in the EEPROM 74 can be altered by the user. If he wishes to alter at least one of the default the values, he enters each of values to be altered with use of the keys provided on the editor 78.

In order to alter default values, desired values such as the attribute for processing data, the reading size (for example, A4 size set in the transverse direction), and the magnification are designated, respectively and, then, the function key F5 is pushed down to set the default setting mode. When it is set, each of the designated default values is written into the non-volatile EEPROM 74. Accordingly, when the power source is turned on next time, the initial setting is performed according to the initializing mode written in the EEPROM 74. Therefore, the image reader is initially set in the mode to be used frequently.

More concretely, the binarizing method is designated by either of keys F3 or F4.

If one wishes to designate a desired binarizing method over the whole area of a document image, another function key is operated without designating a rectangular area after pushing down the key F3 or F4. The reading size and the magnification are set with use of the keys F7 and F8, the entry key group 86 and the set key 88. After setting these default values, they are written into the EEPROM 74 by pushing down the key F5. If the image reader is connected to a personal computer or an office computer, default values can be entered with use of the key board thereof.

(d) Setting of Threshold Value

The threshold value is memorized in the EEPROM 74 comprised of a non-volatile memory. The CPU reads the threshold value memorized in the EEPROM 74 when the power source is turned on and sends it to the fixed threshold circuit 58. This circuit 58 generates the fixed threshold when requested. If the CCD array 9 reads data at a density level among levels defined from 0-th to 127-th, the threshold value can be designated at a density level from 0-th to 127-th.

This threshold value can be set at a value most suitable for an individual image to be processed. Upon setting it, one point on the area 84 of the editor 78 is indicated by pressing the write pen thereon after pushing down the function key F6 for designating the threshold value. The value of X coordinate of the indicated point is memorized as a corresponding binary value into the EEPROM 74. In this case, the maximum value of the X coordinated is made corresponding to the maximum threshold value.

In other words, the X coordinate is divided so as to be proportional to density levels from 0-th to 127-th and, therefore, a density level corresponding to the X coordinate of the point indicated by the write (or light) pen is memorized as a fixed threshold into the EEPROM 74.

It is also possible to determine the fixed threshold from an average value of one line data having been stored into the line RAM 50. Namely, a proper value between two peaks as shown in FIG. 10 or FIG. 11 is set as the fixed threshold. In this case, the fixed threshold is automatically determined according to images contained in a document. This determination method will be stated in detail with use of FIG. 9 later.

(e) Flow for Reading Image

Figure 6:
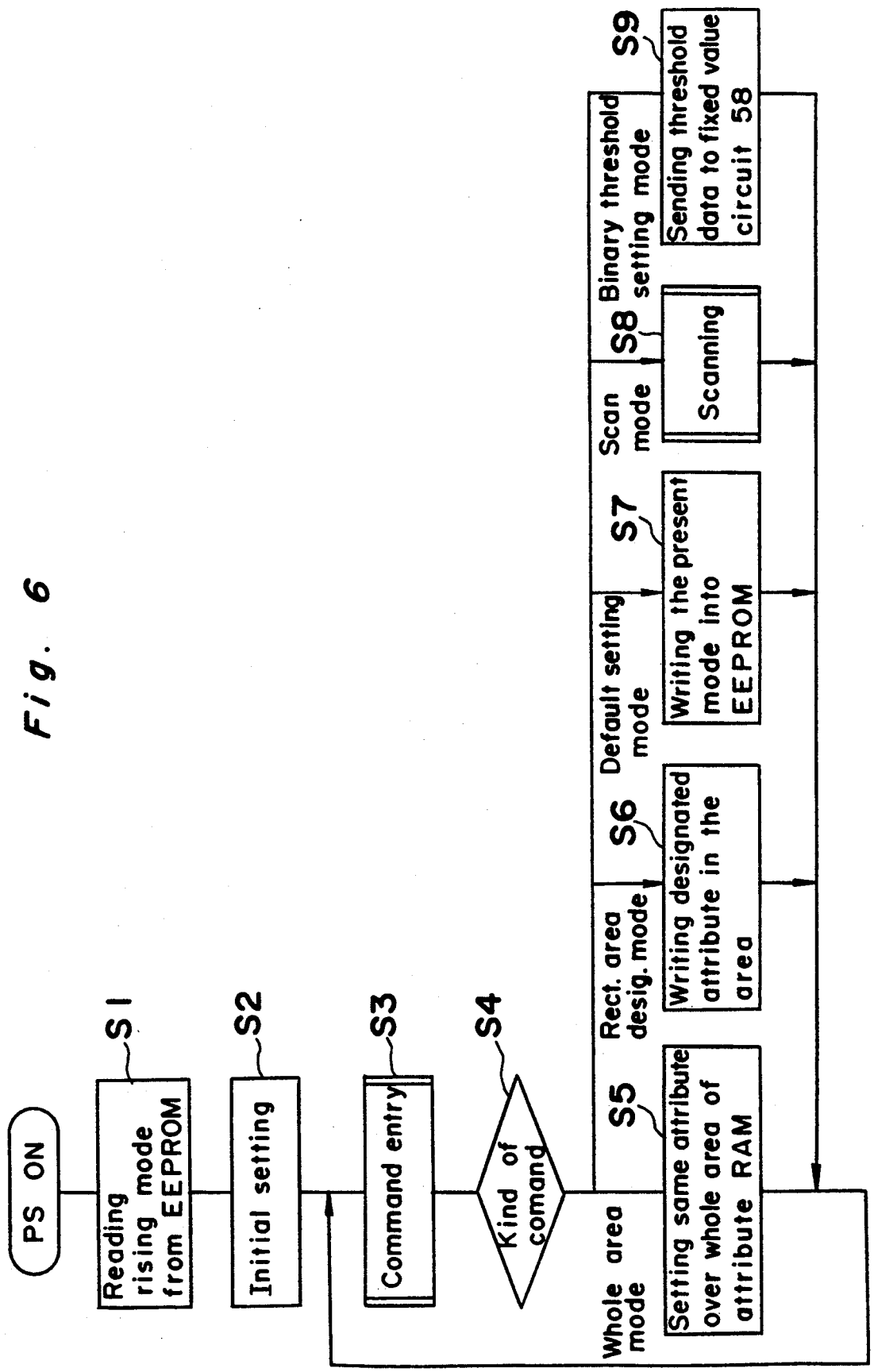
FIG. 6 is a flow chart of a main routine for reading an image of a document.

FIG. 6 shows a main flow to be executed by the CPU 42.

When the power switch is switched on, the CPU 42 reads the initializing mode (default values) stored in the EEPROM 74 at step S1 and performs initial setting according to the rising mode at step S2.

Next, the CPU 42 executes a subroutine for the command entry at step S3 and, according to the entered command, the process advances to either one of steps from S5 to S9.

If the entered command is a command designating a whole area mode, the same attribute such as the fixed threshold or the half-tone is set over the whole area of the attribute RAM 52 at step S5.

If it is a command for designating a rectangular area mode, a designated attribute is set inside or outside of an area designated by two points having coordinates (X1, Y1) and (X2, Y2) at step S6.

If it is a command for a default setting mode, the present image edition mode including the attribute, the area to be edited and the like is written into the EEPROM 74 at step S7, which is able to hold data even if the power switch is turned off.

Figure 8:
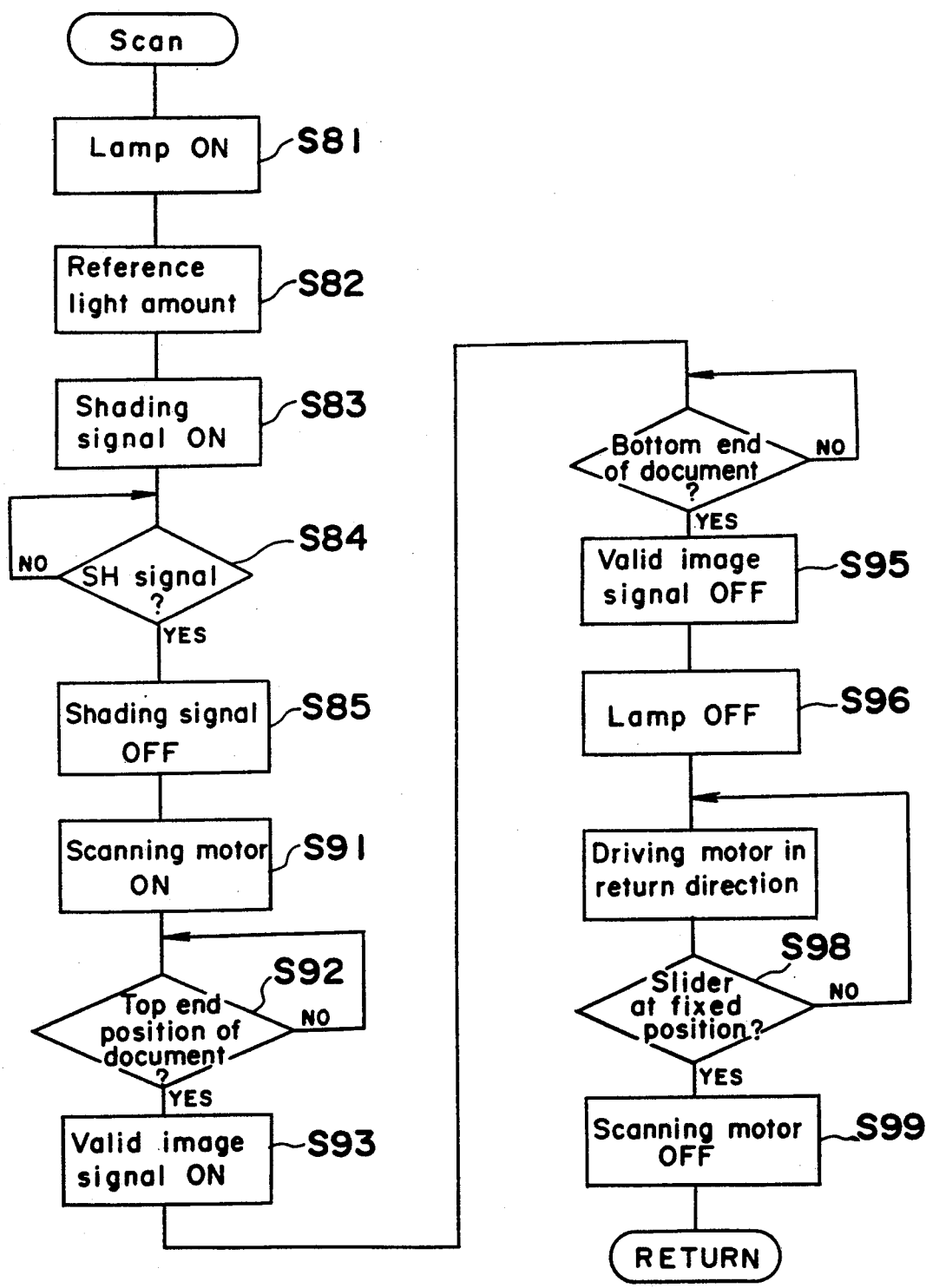
FIG. 8 is a flow chart of the subroutine for scanning operation shown in FIG. 6.

If it is a command requesting a real scan, the scanning operation is performed at step S8 (see FIG. 8).

Figure 7:
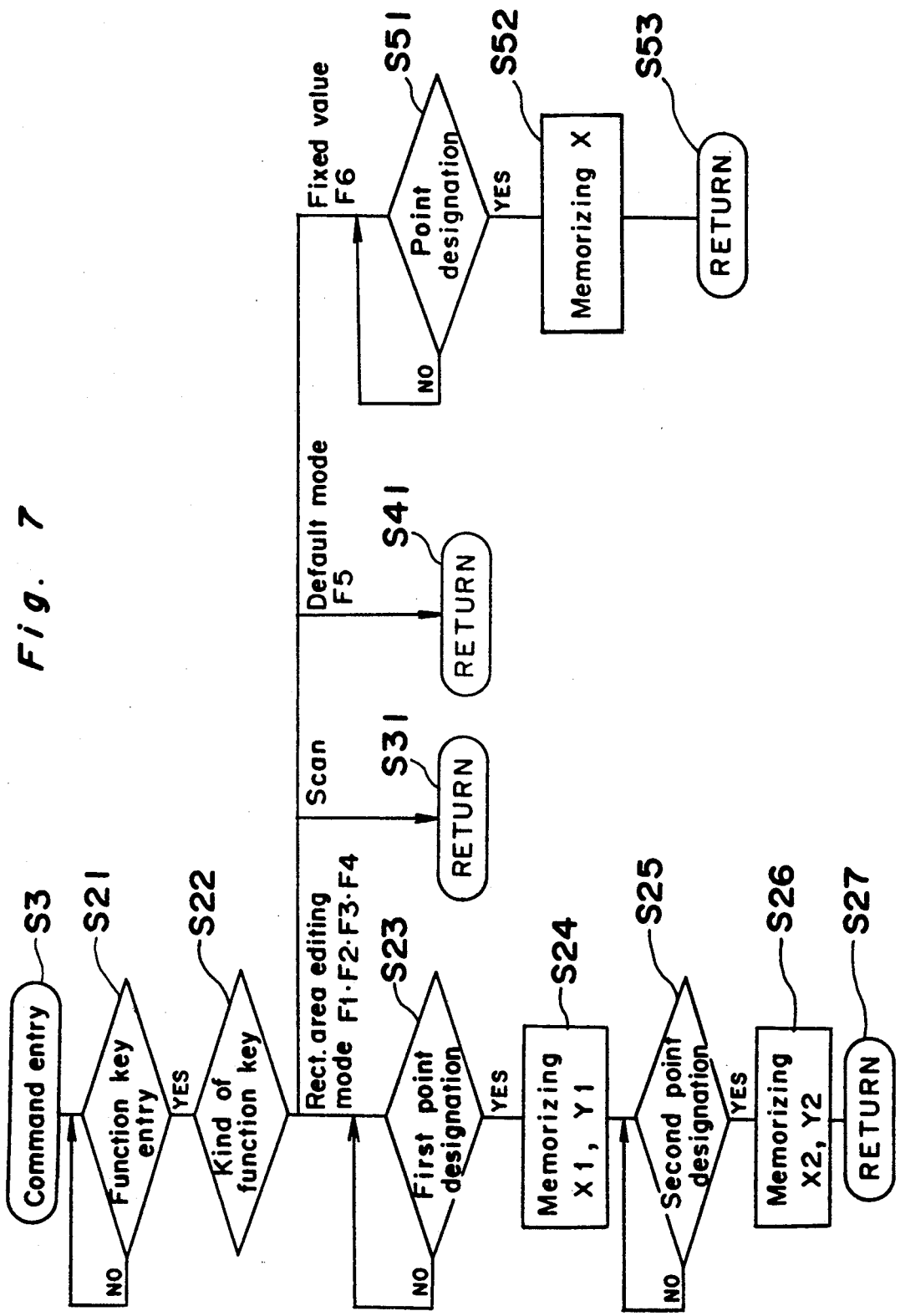
FIG. 7 is a flow chart of the subroutine for command entry shown in FIG. 6.

FIG. 7 is a flow chart of the command entry subroutine step S3 of FIG. 6.

When either one of the function keys from F1 to F8 and the scan key 90 is operated at step S21, the process is advanced to either one of steps S23, S31, S41 and S51 according to the content of the command corresponding to the operated function key at step S22.

If the operated key is either one of the function keys F1 to F4 provided for the rectangular area edition mode, the first apex point of an area to be designated is instructed on the area 84 of the editor 78 by the write pen at step S23, values of the coordinate (X1, Y1) thereof are memorized at step S24.

Next, if the second apex point of the area is instructed on the area 84 at step S25, values of the coordinate (X2, Y2) are memorized at step S26. Thereafter, the process returns at step S27.

If the operated key is the default key F5 or the scan key 90, the process returns directly at step S31 or S41.

If it is the designation key F6 for the fixed threshold, the point is instructed on the area 84 of the editor 78 by the write pen at step S51. Then, the X coordinate of the point is memorized at step S52. This value is used to determine the fixed threshold. Thereafter, the process returns at step S53.

FIG. 8 shows a flow chart of the subroutine for scanning operation (step S8 of FIG. 6).

At first, the illumination lamp 1 is turned on at step S81 and the standard light amount with respect to the illumination lamp 1 is set at step S82.

Next, the shading signal is made "high" and shading data is read at step S83. When SH (Sample and Hold) signal to the CCD array 20 is detected at step S84, the shading signal is made "low" at step S85.

Next, the scanning motor is driven in the scanning direction to start the scanning operation for reading image data at step S91.

When the scanning is proceeded to the top edge position of a document at step S92, the valid image signal is made "high" at step S93 in order to validate output signals from the image reader to an external output apparatus such as a printer. Image data to be outputted from the image reader has been processed according to at least one attribute such as the fixed threshold or the half-tone threshold which is designated in unit of 1 mm$^2$.

When the bottom end of a document is detected at step S94, namely, when the scan is completed, the valid image signal is made "low" at step S95 to invalidate the output signal.

Then, the illumination lamp 1 is turned off at step S96 and the scanning motor is driven in the return direction at step S97. When the scanning system returns to the fixed position at step S98, the scanning motor is turned off at step S99.

Figure 9:
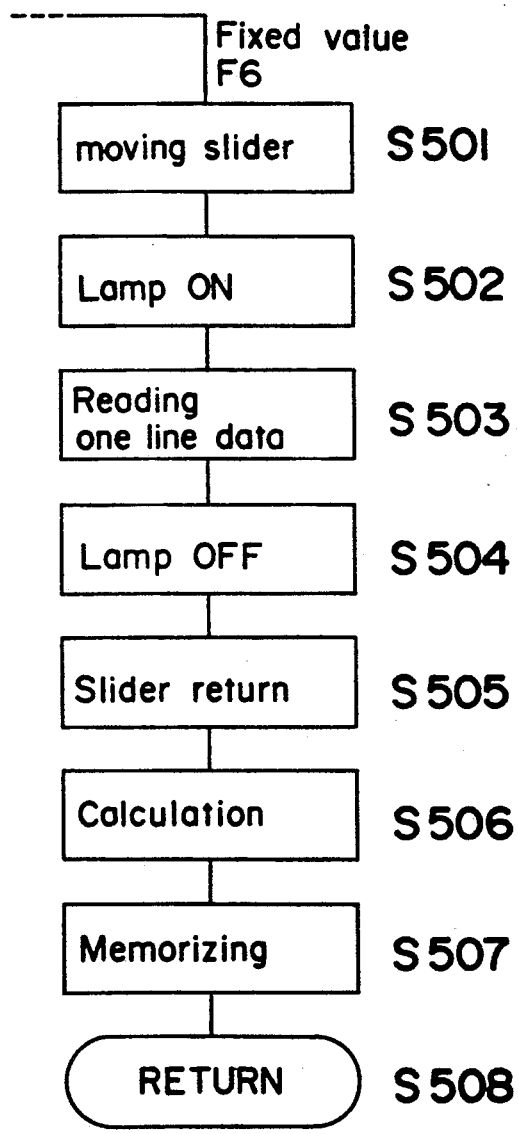
FIG. 9 is a partial flow chart of a variation of the subroutine shown in FIG. 8.

FIG. 9 shows a flow chart for the variation upon setting the fixed threshold. This flow is used in place of steps from S51 to S53 of FIG. 7.

At first, the slider (the scanning system) is moved to a predetermined position in the image area of a document at step S501. This position is set at a position at which a partial image of a document might be exist, for instance at a position remote from the position for starting to read an image of a document by 100 mm.

Next, the illumination lamp 1 is turned on at step S502 and one line image data is read to input into the line RAM 50 at step S503.

Thereafter, the illumination lamp 1 is turned off at step S504 and the slider is made to return to the fixed standard position at step S505.

At the next step S506, one line image data read into the line RAM 50 is analyzed and an intermediate value between an average value of data of the background and that of data of the character portion is calculated. The calculated value is memorized into the EEPROM 74 as the fixed threshold to be used.

This value can be calculated from two or more line image data.

The preferred embodiments described herein are illustrative and not restrictive, the scope of the invention being indicated by the appended claims and all variations which come within the meanings of the claims are intended to be embraced herein.

What is claimed is:

1. An image reader for reading an image of a document by an image sensor and for outputting image data after processing obtained image data, comprising:
   binarization means for binarizing image data ready by said image sensor by comparing respective image data with a fixed threshold, said fixed threshold being held constant at a predetermined value during processing image data belonging to at least one image area of a document, wherein said at least one image are a of the document defines a portion of the image of the document;
   means for designating and entering said at least one image area of the document and for designating and entering said fixed threshold to be compared with image data of the designated image area from an exterior source;
   means for giving said designated image area of the document and said designated fixed threshold to said binarization means; and
   control means for controlling said giving means so as to give said designated image area and said designated fixed threshold entered by said designating and entering means to the binarization means;
   wherein said designating and entering means includes;
   memory means for memorizing designated and entered fixed thresholds by image areas.

2. An image reader for reading an image from a document with an image sensor and for processing the image read from the document, comprising:
   means for processing the image read by said image sensor based upon attribute information, said attribute information including at least threshold information for binarizing the image;
   rewritable non-volatile memory means for storing said attribute information;
   designating means for allowing an operator to designate said attribute information;
   means for writing said designated attribute information into said non-volatile memory means and for automatically giving said designated attribute information to said processing means when a power switch of the image reader is switched on.

3. An image reader as claimed in claim 2, in which said attribute information further includes a magnification for reading an image of a document.

4. An image reader as claimed in claim 2, in which said attribute information further includes a size of a document to be read.

5. An image reader as claimed in claim 2 wherein said attribute information is a threshold fixed at a specified value during processing of the image belonging to at least one portion of the document, and wherein said designating means allows an operator to alter the specified value.

6. An image reader as claimed in claim 2 wherein said designating means includes an editor.

7. An apparatus as claimed in claim 2, wherein said attribute information is selected from a group comprising instructions concerning binary value processing, dither matrix processing, image inversion processing, and image deletion processing.

8. An image reader for reading an image of a document by an image sensor and for outputting image data after processing obtained image data, comprising:
   means for processing image data read by said image sensor based upon attribute information, said attribute information including at least threshold information for binarizing image data;
   rewritable non-volatile memory means for storing said attribute information;
   means for selecting and entering said attribute information;
   means for writing the selected and entered attribute information into said non-volatile memory means and for automatically giving said selected and entered attribute information to said processing means when a power switch of the image reader is switched on
   wherein said threshold information is a threshold fixed at a specified value during processing image data belonging to at least one image area of a document, and said selecting and entering means enters values to be altered from respective specified values.

* * * * *